United States Patent Office 2,904,480
Patented Sept. 15, 1959

2,904,480

POLYETHYLENE

William C. Rainer, Edward M. Redding, and Joseph J. Hitov, Baltimore, Md., and Arthur W. Sloan and William D. Stewart, Alexandria, Va., assignors, by mesne assignments, to W. R. Grace & Co., Cambridge, Mass., a corporation of Connecticut No Drawing. Application June 6, 1955
Serial No. 513,602

10 Claims. (Cl. 204—154)

The present invention relates to polyethylene.

Polyethylene is widely used today in making containers, e.g. squeeze bottles, toys, film packaging materials, etc. Despite its many advantages in these and other uses, it suffers from the disadvantage that it is normally translucent or opaque rather than transparent in appearance at room temperature, and, hence, cannot be used in applications where a clear, water-white material is desired.

It is known that solid polyethylene can be physically transformed into a clear, transparent plastic or liquid, when elevated to its transition point, which is approximately 105° to 125° C. However, this transparency is normally lost upon cooling, unless special methods are employed and, even with such special methods, the transparency is not retained if the polymer is reheated to its transition point and slowly cooled. The transition point of polyethylene is commonly referred to as its transparent or softening point. There also is some variation in transition point, depending on the average molecular weight of the polymer. With a molecular weight of about 20,000, the transition point is generally about 110° C.

It is an object of the present invention to prepare a polyethylene which can be molded by conventional transfer, compression, and injection molding and extrusion procedures to obtain a clear, water-white product.

A further object of the present invention is to prepare a clear, water-white polyethylene of increased strength and toughness.

A further object is to prepare an irradiated polyethylene which is clear, transparent and free from gas bubbles.

Another object is to preshape or mold conventional translucent polyethylene and, thereafter, convert it into transparent polyethylene without distorting the shape.

An additional object is to prepare such a shaped polyethylene which will retain its clarity throughout a subsequent heating and slow cooling process.

Still further objects and the entire scope of applicability of the present invention will become apparent from the detailed description given hereinafter; it should be understood, however, that the detailed description and specific examples, while indicating preferred embodiments of the invention are given by way of illustration only, since various changes and modifications within the spirit and scope of the invention will become apparent to those skilled in the art from this detailed description.

In the past, it has been proposed to make transparent polyethylene film by heating polyethylene and then quickly cooling the polyethylene to room temperature or below. Alternatively, it has been suggested to obtain transparency by stretching the polyethylene. These procedures, while giving transparent polyethylene, suffer from the disadvantage that it is impossible to form articles other than films from the polyethylene and retain the transparency. Thus, it has not been found practical to form bottles, jars and other objects of transparent polyethylene.

It has now been found that articles, such as sheets, closures, containers, etc., made from non-irradiated polyethylene may be rendered water-clear in transparency by irradiating the same at a temperature below the softening transition point, e.g., room temperature at the proper dosage level, e.g., 50 to $100 \times 10^6$ REP and, subsequently, elevating the temperature of said irradiated articles to the point of full clarity, and rapidly cooling, i.e., quenching, preferably to room temperature, or below, such as 0° C. Polyethylene jars or other containers, having desirable firmness and transparency, may be made in this manner. The irradiation should be carried out until there is a significant increase in the softening point. This, generally, requires a dosage of at least about $12 \times 10^6$ REP, preferably, $20 \times 10^6$ REP to $100 \times 10^6$ REP, with polyethylene having a molecular weight of about 20,000. Some changes in the irradiation dosage, to give the desired increase in softening point, of course, will occur with polyethylene of higher or lower molecular weight.

Articles made from non-irradiated polyethylene cannot be subjected to elevated temperatures to develop clarity. Before reaching the clear or transition temperature, such articles will deform to the point of uselessness. Articles, however, made from highly irradiated polyethylene, retain their structural identity when elevated to the original clear or transition temperature, hence, permitting rapid cooling to bring about room temperature water-clear transparency.

As a further feature of the invention, it has been found that, if the molded article, e.g., a beaker, is irradiated below the transition temperature of the original polyethylene to a sufficient extent to maintain its shape when heated to the transition or clear point, it can then be further irradiated while in the clear state and at or above the original transition point, but below the deformation point of the irradiated polyethylene, to permanently fix the clarity and transparency, so that the article can then be allowed to return to atmospheric temperature either slowly or rapidly without loss of clarity. The amount of clarity retained will depend upon the extent of the irradiation treatment at the elevated temperature. Generally, for significant retention of clarity, the additional irradiation should be at least about $10 \times 10^6$ REP and, preferably, is $50 \times 10^6$ REP, or more. There can be as much as $100 \times 10^6$ REP additional irradiation. The total amount of irradiation (i.e., the amount used below the transition point of the original polyethylene, together with that used at or above this point) in this process can vary from $60 \times 10^6$ REP to $200 \times 10^6$ REP. Irradiation of polyethylene in the transparent state, when it is in the soft plastic condition, is invariably accompanied with blistering occasioned by the spontaneous eruption of hydrogen and other gaseous products. In order, however, to prevent the development of such blisters in the beaker walls, or other article, when irradiated above its hot clear point, the initial irradiation of the polyethylene below its transition point should be at a minimum dosage of approximately $50 \times 10^6$ REP and need not exceed $76 \times 10^6$ REP.

The polyethylene employed should be one which is solid at room temperature and may have a molecular weight of 7,000; 12,000; 19,000; 21,000; 24,000; 30,000; 35,000 or even higher. For many useful results, the molecular weight should be at least 12,000 and, preferably, the molecular weight is about 20,000 to 28,000. The transition or softening point of the polyethylene is generally about 105° to 125° C.

The following examples illustrate typical methods of carrying out the invention.

*Example I*

Translucent beakers, 40 mils thick, were molded in conventional fashion from polyethylene having a molecular weight of about 20,000 and a softening point of about 110° C.

A Van de Graff electrostatic generator, manufactured by the High-Voltage Engineering Corporation, Cambridge, Mass., was used as a source of a beam of electrons. This machine is a high voltage X-ray generator and was modified by removal of the tungsten target from the path of the electrons to permit thereby irradiation of objects at the port. The generator was operated at two million volts with an amperage of 41 microamps. at the target area per inch of scan.

These beakers were subjected to the electron beam to absorb dosages of 4, 12, 20, 50 and $100 \times 10^6$ REP, respectively. The breakers were then heated to about 120° C. to render them transparent. As soon as transparency was obtained, the hot beakers were quenched to room temperature by immersion in a large volume of water. The resulting beakers were transparent in varying degrees, dependent upon the amount of irradiation. The beakers, irradiated at $50 \times 10^6$ REP and $100 \times 10^6$ REP, were phenomenally clear. Instead of quenching to room temperature, equally good results were obtained by quenching the hot beakers in an ice water bath at 2° C.

Irradiation at the dosage levels, above cited, has varying influence on the deformation temperature of the beakers, e.g.

| Dosage at Room Temperature | Condition of Beaker at 120° C. |
|---|---|
| 0 | Collapsed to base. |
| $4 \times 10^6$ REP | Deformed approximately 50%. |
| $12 \times 10^6$ REP | Diameter decreased approximately 3%, but otherwise no deformation developed. |
| $20 \times 10^6$ REP | No deformation. |
| $50 \times 10^6$ REP | No deformation. |
| $100 \times 10^6$ REP | No deformation. |

It is evident from the above that the minimum irradiation dosage should be above $4 \times 10^6$ REP and preferably above $12 \times 10^6$ REP for preserving the form of the beakers on heating. For excellent stability and clarity on quenching, the dosage administered should be at least about $20 \times 10^6$ REP; for best results $50 \times 10^6$ REP. There appears to be no significant difference in these properties of the polyethylene beakers irradiated at $50 \times 10^6$ REP and $100 \times 10^6$ REP. The polyethylene beakers, made clear as recited in Example I, do not lose any noticeable portion of their clarity when heated to 104° C. Boiling in water (100° C.), for 1/2 hours, likewise, does not seem to affect clarity in the beakers.

*Example II*

Example I was repeated, but the irradiation dosage was increased to about $125 \times 10^6$ REP by extending the time under the electron beam. The hot beaker, after quenching to room temperature, was transparent. The samples in the examples were positioned to travel forwards and backwards under the irradiation beam. Each passage under the beam took 0.75 second and supplied a dosage of $2 \times 10^6$ REP to the polyethylene.

*Example III*

A translucent bottle 45 mils thick was formed in conventional manner from polyethylene having a molecular weight of about 20,000 and a softening point of about 110° C. The bottle was irradiated at room temperature with the electron beam described in Example I, until the bottle had received a dosage of $60 \times 10^6$ REP. The bottle was then heated to 120° C. to develop transparency. At this temperature, the bottle was subjected to a further irradiation dosage of $50 \times 10^6$ REP. Upon slow cooling to room temperature, the bottle retained a very substantial amount of its transparency.

By slow or gradual cooling is meant that the heated sample is allowed to cool of its own accord by standing in the atmosphere without applying any specific cooling agent thereto.

The irradiation of polyethylene, which has been heated to its transition or softening point when it is crystal clear, poses a problem of blistering from the gases evolved as a result of electron bombardment. Sheets of polyethylene, irradiated initially in the molten state, become disfigured throughout by the formation of these blisters which remain after removal from the electron beam and cooling to room temperature, even though the resultant sample is transparent. Non-irradiated polyethylene at its transition or melting point has little or no strength to resist the formation of blisters. It has now been found that, if polyethylene is first subjected to a definite minimum irradiation dose below its softening point, where it does have adequate strength, and then heated to or above its clear point, which is approximately its original softening point, at which point it now possesses considerable strength, blisters will no longer form. This effect is shown in the following example.

*Example IV*

To demonstrate more effectively the differences in appearance before and after irradiation at 120° C., polyethylene DYNH (Bakelite) of approximately 21,000 molecular weight, which was white opaque in sheet form at a thickness of 0.140″ to 0.170″, was used in this experiment.

| Code | Initial dosage at room temp. | Final dosage at 120° C. | Appearance after cooling to room temp. |
|---|---|---|---|
| 24A [1] | $12 \times 10^6$ REP | $36 \times 10^6$ REP | Frosty opaque many blisters. |
| 25A [1] | $16 \times 10^6$ REP | $36 \times 10^6$ REP | Do. |
| 26A [1] | $20 \times 10^6$ REP | $10 \times 10^6$ REP | Milky opaque many blisters. |
| 27A [1] | $28 \times 10^6$ REP | $10 \times 10^6$ REP | Do. |
| 28A | $40 \times 10^6$ REP | $50 \times 10^6$ REP | Transparent reduced number of blisters. |
| 29A | $52 \times 10^6$ REP | $50 \times 10^6$ REP | Best transparency several blisters (less than 28A). |
| 30A | $76 \times 10^6$ REP | $50 \times 10^6$ REP | Transparent no blisters. |
| 31A | $100 \times 10^6$ REP | $50 \times 10^6$ REP | Transparent — no blisters, tending to retrogress towards milkiness; not as good as 28A, 29A and 30A. |

[1] Higher dosages were not given at 120° C. in view of excessive blistering.

From the above, it is evident that the initial dosage at room temperature for sheets 0.140″ to 0.170″ thick should be no less than about $52 \times 10^6$ REP and, for best results, need be no more than about $76 \times 10^6$ REP, and that the final dose at 120° C. should be no less than about $50 \times 10^6$ REP, and need be no more than $76 \times 10^6$ REP. The final transparency of sample 28A was a shade better than sample 30A. That of sample 29A was the best. Sample 31A was irradiated too far initially for best results, the molecular arrangement by irradiation at room temperature was loath to conform to the new setting brought about at the final dosage at 120° C. The initial and final dosage should be equal, or preferably, the final dose should exceed the initial dose. The initial dosage minimum is about $52 \times 10^6$ REP. Crystal clarity should be evidenced, free of bubble disfigurement, when the initial dosage is about $56 \times 10^6$ REP, and the final dosage is about $76 \times 10^6$ REP. It is advisable that the total amount of irradiation be kept below $200 \times 10^6$ REP for, at this dosage, polyethylene assumes a permanent amber tint.

After the source of heat was removed from the polyethylene sheets, which were irradiated in the hot clear state, and were in process of cooling, a strange phenomenon occurred. The crystal clarity gave way to deep milkiness, which, in turn, reshifted to transparency. It appeared that opposing forces were at work as the sheet began to increase in density, as a result of shrinking, in view of declining temperature, which tended to move the molecules from their quasi fixed position, causing opacity to develop momentarily but, as the whole settled down in temperature, returned for the most part to their newly acquired position which was permanently established by irradiation in the hot clear condition.

*Example V*

To conserve irradiation time and cost, and still produce clear, transparent polyethylene, a sheet of approximately 0.170" thickness was irradiated at $20\times10^6$ REP at room temperature, heated beyond its clear point to approximately 145° C. and then chilled in ice water to develop limited transparency. The sample was then irradiated at room temperature while in the cold relatively clear state at $32\times10^6$ REP to fix its cold clear point temporarily, and then heated to its hot clear point and then irradiated at $50\times10^6$ REP and cooled slowly to room temperature. The result was a noticeable improvement over the procedure recited in Example IV.

*Example VI*

Example V was repeated but the final cooling was done by quenching to room temperature to give comparable results.

*Example VII*

Following the procedure outlined in Example I, beakers were subjected to the electron beam to absorb dosages of 4, 12, 20, 50 and $100\times10^6$ REP, and after the irradiated beakers had been quenched to develop clarity, said beakers were irradiated a second time at room temperature while in their newly acquired clear state at $50\times10^6$ REP to fix the clarity permanently. Whereas the clarity of the polyethylene beakers, produced in accordance with the procedure recited in Example I, was destroyed when said beakers were reheated to 120° C. and slowly cooled, the clarity of the breakers, developed in Example VII, was no longer affected by the subsequent heating thereof to 120° C. or higher followed by slow cooling to room temperature.

A REP, as is recognized in the art, is defined as that amount of nuclear radiation which dissipates 93 ergs of energy per gram of tissue producing $1.61\times10^{12}$ ion pairs in the process. It is approximately equal to the amount of energy that would be dissipated by a one roentgen X-ray beam in a gram of tissue.

As the amount of irradiation dosage administered is increased, the polyethylene diminishes in thermoplasticity until finally, transformation is effected into a thermosetting plastic.

The polyethylene irradiated in the shape of a molded article can have a thickness of 3 mils or less (e.g., 1 mil) up to 100 mils or even higher, e.g., 250 mils, but is preferably about 40 to 50 mils. For thicknesses above 250 mils, the voltage should be above 2,000,000 and can be 3,000,000 volts or 6,000,000 volts or even higher. Voltages as low as 1,000,000 volts or 750,000 volts, or even somewhat lower, can also be employed with thicknesses less than 250 mils. The exact voltage is not critical, it is only essential that the voltage be sufficient that the electron beam will pass through the polyethylene.

Ozone has an adverse effect upon polyethylene. Consequently, it is frequently desirable to have good ventilation or to carry out the irradiation while the polymer is in an atmosphere of inert gas, such as nitrogen or argon. Thus, the irradiation process of Example II can be carried out while continuously passing a stream of argon over the polyethylene.

It is also sometimes desirable to carry out the irradiation while the polyethylene is maintained in a vacuum, e.g., 1 mm. or less. Thus, the irradiation in Example II can be carried out while the polyethylene is in a vacuum of 0.1 mm. total pressure.

While the irradiation is preferably carried out with electrons, as set forth above, it is also possible to use other means of irradiation. Thus, if the tungsten target is put back, the machine described in Example I will permit X-rays to hit the polyethylene by placing the polymer by the side of the target. However, irradiation with X-rays takes longer than with electrons to obtain the same effect. It is also possible to irradiate with $\beta$-rays, e.g., by employing cobalt 60, carbon 14, phosphorus 32, or strontium 90, as a source of irradiation. Gamma-rays can be used, e.g., by submitting the polyethylene to irradiation from iron 59 or cobalt 60. Neutrons, protons, $\alpha$-particles and deuterons also may be employed to bombard the polyethylene. For different kinds of radiation on different kinds of matter, the effects differ primarily in degree rather than in kind.

Instead of using the Van de Graff electrostatic generator as the source of the electron beam, other sources of high energy electrons can be employed, such as the General Electric 800,000 volt resonant transformer unit described by Lawton et al. in Industrial and Engineering Chemistry, vol. 46, pages 1703 to 1709.

As previously set forth, a process, such as that described in the Lawton article, will not produce a clear polyethylene, as irradiation can only accomplish this result when the polyethylene is transparent at the time of treatment and Lawton treats conventional translucent polyethylene at room temperature.

It is important to note that a process comprising merely irradiating a molded article at room temperature and then heating to the former transition point and then cooling the article, as has been proposed in some journals, will not result in a clear and transparent polyethylene. It is essential that the cooling be rapid, i.e., quenching, or that the formed article be further irradiated while clear to set the clarity.

There can also be employed other conventional apparatus for producing beams of electrons, such as those recited, for example, in Brophy Patent No. 2,668,133, column 3, lines 5 to 29.

As previously pointed out, for best results, the total irradiation dose should at least be about $50\times10^6$ REP and the polyethylene should have a molecular weight before irradiation of about 20,000 or above. With polyethylene having a molecular weight of 7,000, it is necessary to employ a dosage of at least $100\times10^6$ REP, in order to get satisfactory cross-linking and even higher dosages are necessary for lower molecular weight polymers. Correspondingly, lower dosages can be used to obtain cross linking of higher molecular weight polymers.

The polyethylene can be molded into any desired form prior to the irradiation. Thus, it can be molded into a container, e.g., a beaker or jar or a bottle, or a cap liner, e.g., a crown cap liner, or a ring gasket, or a box.

The uses recited above are not exhaustive but are illustrative only and in no way limit the invention.

We claim:
1. A process comprising irradiating polyethylene below about 105° C. with high energy irradiation equivalent to at least about 750,000 electron volts at a dosage of at least about $2\times10^6$ REP until its deformation point is substantially raised, then heating the polyethylene to the point of clarity and transparency but below the new deformation point, then quenching the polyethylene to develop limited transparency, then further irradiating the polyethylene about 105° C. with high energy irradiation equivalent to at least about 750,000 electron volts below the original deformation point to fix the transparency, then heating the irradiated polyethylene to at least its hot clear point and further irradiating said polyethylene about 105° C. with high energy irradiation equivalent to at least about 750,000 electron volts while at the elevated temperature, to obtain a fixed higher degree of clarity the total irradiation after the initial irradiation being between $10\times10^6$ REP and $100\times10^6$ REP and the total irradiation for the entire process not being over about 200×10⁶ REP and then permitting the finally fixed clear polyethylene to cool.

2. A process comprising irradiating polyethylene at a dosage of at least about 12×10⁶ REP below about 105° C. with high energy irradiation equivalent to at least about 750,000 electron volts until the deformation point is substantially raised, then heating the polyethylene to the point of clarity and transparency but below the new deformation point, quenching the irradiated polyethylene to fix clarity, irradiating the quenched polyethylene with high energy irradiation equivalent to at least about 750,000 electron volts at a temperature below the deformation point of the original polyethylene at a dosage of at least about 10×10⁶ REP to fix the clarity obtained by quenching, the total irradiation dosages not exceeding about 200×10⁶ REP.

3. A process comprising irradiating polyethylene below about 105° C. with high energy irradiaton equivalent to at least about 750,000 electron volts at a dosage between about 12×10⁶ REP and 200×10⁶ REP whereby its deformation point is substantially raised, then heating the polyethylene to the clear point and transparency but below the new deformation point, thereafter cooling the polyethylene in a manner to retain a substantial part of the transparency and further irradiating the polyethylene with high energy irradiaton equivalent to at least about 750,000 electron volts at a temperature at least as high as the clear point but below the deformation point of the irradiated polyethylene in an amount to substantially preserve clarity upon slow cooling of the polyethylene.

4. A process according to claim 3 wherein the second irradiation treatment is carried out to an extent of at least 10×10⁶ REP.

5. A process according to claim 3 wherein the second irradiation treatment is carried out to an extent of between about 50×10⁶ REP and 76×10⁶ REP.

6. A process comprising irradiating polyethylene below about 105° C. with high energy irradiation equivalent to at least about 750,000 electron volts at a dosage between about 50×10⁶ REP and 200×10⁶ REP whereby its deformation point is substantially raised, then heating the polyethylene to the clear point and transparency but below the new deformation point, thereafter cooling the polyethylene in a manner to retain a substantial part of the transparency and further irradiating the polyethylene with high energy irradiation equivalent to at least about 750,000 electron volts at a temperature at least as high as the clear point but below the deformation point to fix a substantial amount of the transparency upon slow cooling.

7. A process comprising irradiating polyethylene below about 105° C. with high energy irradiation equivalent to at least about 750,000 electron volts at a dosage between about 50×10⁶ REP and 200×10⁶ REP whereby its deformation point is substantially raised, then heating the polyethylene to the clear point and transparency but below the new deformation point, thereafter cooling the polyethylene in a manner to retain a substantial part of the transparency wherein the irradiation is carried out with electrons at about room temperature and in which the polyethylene is further irradiated in the clear condition with high energy irradiation equivalent to at least about 750,000 electron volts to retain the clarity on slow cooling.

8. A process comprising irradiating polyethylene below about 105° C. with high energy irradiation equivalent to at least about 750,000 electron volts at a dosage between about 50×10⁶ REP and 75×10⁶ REP whereby its deformation point is substantially raised, then heating the polyethylene to the clear point and transparency but below the new deformation point, thereafter cooling the polyethylene in a manner to retain a substantial part of the transparency and is then subjected to a temperature at least as high as the clear point but below the deformation point of the irradiated polyethylene and is given a further irradiation with high energy irradiation equivalent to at least about 750,000 electron volts of 50×10⁶ to 100×10⁶ REP.

9. A process according to claim 8 in which the irradiation is done with electrons.

10. A process comprising irradiating polyethylene at a dosage of at least about 12×10⁶ REP below about 105° C. with high energy irradiation equivalent to at least about 750,000 electron volts until the deformation point is substantially raised, then heating the polyethylene to the point of clarity and transparency but below the new deformation point, quenching the irradiated polyethylene to fix clarity, further irradiating the quenched polyethylene with high energy irradiation equivalent to at least about 750,000 electron volts at a temperature below the deformation point of the irradiated polyethylene in an amount sufficient to substantially preserve the clarity upon slow cooling of the polyethylene, the total irradiation dosages not exceeding about 200×10⁶ REP.

References Cited in the file of this patent

Charlesby: (I) "Proceedings Royal Soc.," London (November–December 1952), vol. 215A, pages 187–212.

Charlesby: (II) "Nucleonics" (June 1954), pages 18–25.

Sun—"Modern Plastics," vol. 32 (September 1954), page 229, entire article includes pages 141–144, 146, 148, 150, 229–233, 236–238.